(12) United States Patent
Ogino et al.

(10) Patent No.: US 12,217,542 B2
(45) Date of Patent: Feb. 4, 2025

(54) IMAGING SYSTEM, IMAGING METHOD, AND NON-TEMPORARY COMPUTER-READABLE MEDIUM STORING IMAGING PROGRAM

(71) Applicant: NEC Corporation, Tokyo (JP)

(72) Inventors: Yuka Ogino, Tokyo (JP); Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 125 days.

(21) Appl. No.: 17/912,222

(22) PCT Filed: Mar. 30, 2020

(86) PCT No.: PCT/JP2020/014628
§ 371 (c)(1),
(2) Date: Sep. 16, 2022

(87) PCT Pub. No.: WO2021/199188
PCT Pub. Date: Oct. 7, 2021

(65) Prior Publication Data
US 2023/0126960 A1    Apr. 27, 2023

(51) Int. Cl.
*H04N 23/69* (2023.01)
*G06V 10/141* (2022.01)
(Continued)

(52) U.S. Cl.
CPC ............ *G06V 40/19* (2022.01); *G06V 10/141* (2022.01); *G06V 10/25* (2022.01); *G06V 40/197* (2022.01);
(Continued)

(58) Field of Classification Search
CPC ...... G06V 40/19; G06V 10/141; G06V 10/25; G06V 40/197; G06V 40/67; H04N 23/611;
(Continued)

(56) References Cited

U.S. PATENT DOCUMENTS

2005/0084179 A1    4/2005  Hanna et al.
2010/0290668 A1*  11/2010  Friedman ............... G06V 40/19
                                                          348/78
(Continued)

FOREIGN PATENT DOCUMENTS

JP    2005-244549 A     9/2005
JP    2006-338236 A    12/2006
(Continued)

OTHER PUBLICATIONS

International Search Report for PCT Application No. PCT/JP2020/014628, mailed on Sep. 15, 2020.
(Continued)

*Primary Examiner* — Yogesh K Aggarwal
(74) *Attorney, Agent, or Firm* — Sughrue Mion, PLLC

(57) ABSTRACT

An imaging system (10) according to the disclosure includes: a first control unit (11) configured to control, in such a way as to fix a focal position in a predetermined position, an iris imaging means for capturing an image focusing on an iris of a target person; an authentication unit (12) configured to authenticate the target person, based on an iris image of the target person being captured by the iris imaging means controlled by the first control unit (11); and a second control unit (13) configured to control the iris imaging means in such a way as to scan a focal position in a predetermined range, in order to re-authenticate the target person when authentication of the target person fails.

18 Claims, 13 Drawing Sheets

(51) Int. Cl.
  *G06V 10/25* (2022.01)
  *G06V 40/18* (2022.01)
  *G06V 40/19* (2022.01)
  *G06V 40/60* (2022.01)
  *H04N 23/611* (2023.01)
  *H04N 23/67* (2023.01)
  *H04N 23/695* (2023.01)
  *H04N 23/90* (2023.01)

(52) U.S. Cl.
  CPC .......... *G06V 40/67* (2022.01); *H04N 23/611* (2023.01); *H04N 23/675* (2023.01); *H04N 23/69* (2023.01); *H04N 23/695* (2023.01); *H04N 23/90* (2023.01)

(58) Field of Classification Search
  CPC .... H04N 23/675; H04N 23/69; H04N 23/695; H04N 23/90; G06F 21/32
  See application file for complete search history.

(56) References Cited

U.S. PATENT DOCUMENTS

| | | |
|---|---|---|
| 2011/0216211 A1 | 9/2011 | Jelinek et al. |
| 2017/0255822 A1 | 9/2017 | Kwak |

FOREIGN PATENT DOCUMENTS

| | | | |
|---|---|---|---|
| JP | 2007-504562 A | | 3/2007 |
| JP | 2008052317 A | * | 3/2008 |
| JP | 2016-053896 A | | 4/2016 |
| JP | 2017-097741 A | | 6/2017 |
| JP | 2018-109935 A | | 7/2018 |
| WO | 2009/016846 A1 | | 2/2009 |
| WO | 2016/039582 A1 | | 3/2016 |

OTHER PUBLICATIONS

Extended European Search Report dated Apr. 5, 2023 in European Application No. 20928389.4.

JP Office Communication for JP Application No. 2023-206102, mailed on Oct. 22, 2024 with English Translation.

Yuka Ogino et al., "Fast image selection method for iris capturing at a distance", FIT 2019, 18th Forum on Information Technology Lecture Collected Papers, The 3rd separate vol. Aug. 20, 2019, p. 95-p. 96.

* cited by examiner

IMAGING SYSTEM, IMAGING METHOD, AND NON-TEMPORARY COMPUTER-READABLE MEDIUM STORING IMAGING PROGRAM

This application is a National Stage Entry of PCT/JP2020/014628 filed on Mar. 30, 2020, the contents of all of which are incorporated herein by reference, in their entirety.

TECHNICAL FIELD

The disclosure relates to an imaging system, an imaging method, and a non-transitory computer-readable medium that stores an imaging program.

BACKGROUND ART

Iris authentication using an iris of an eye has been known as one biometric authentication. In the iris authentication, an iris of a target person is captured by using an imaging system, and authentication of the target person is performed based on the captured iris image. In such an imaging system, when authentication of a target person fails, re-authentication is performed as necessary.

For example, Patent Literatures 1 to 3 have been known as related techniques. Patent Literature 1 describes that a re-authentication area for a target person who fails in iris authentication to perform re-authentication is provided. Further, Patent Literatures 2 and 3 describe a face authentication system that captures an image of a face of a target person passing through a gate and performs face authentication.

CITATION LIST

Patent Literature

[Patent Literature 1] International Patent Publication No. WO2009/016846
[Patent Literature 2] Japanese Unexamined Patent Application Publication No. 2018-109935
[Patent Literature 3] Japanese Unexamined Patent Application Publication No. 2016-53896

SUMMARY OF INVENTION

Technical Problem

The imaging system as described above is required to effectively perform re-authentication at a time of authentication failure.

An object of the disclosure is to provide an imaging system, an imaging method, and a non-transitory computer-readable medium that stores an imaging program, for solving the problem described above.

Solution to Problem

An imaging system according to the disclosure includes: a first control means for controlling, in such a way as to fix a focal position in a predetermined position, an iris imaging means for capturing an image focusing on an iris of a target person; an authentication means for authenticating the target person, based on an iris image of the target person being captured by the controlled iris imaging means; and a second control means for controlling the iris imaging means in such a way as to scan a focal position in a predetermined range, in order to re-authenticate the target person when authentication of the target person fails.

An imaging method according to the disclosure includes: controlling, in such a way as to fix a focal position in a predetermined position, an iris imaging means for capturing an image focusing on an iris of a target person; authenticating the target person, based on an iris image of the target person being captured by the controlled iris imaging means; and controlling the iris imaging means in such a way as to scan a focal position in a predetermined range, in order to re-authenticate the target person when authentication of the target person fails.

A non-transitory computer-readable medium configured to store an imaging program according to the disclosure is a non-transitory computer-readable medium configured to store an imaging program for causing a computer to execute processing of: controlling, in such a way as to fix a focal position in a predetermined position, an iris imaging means for capturing an image focusing on an iris of a target person; authenticating the target person, based on an iris image of the target person being captured by the controlled iris imaging means; and controlling the iris imaging means in such a way as to scan a focal position in a predetermined range, in order to re-authenticate the target person when authentication of the target person fails.

EXAMPLE EMBODIMENT

Example embodiments will be described below with reference to the drawings. For clarification of the description, the description and the drawings below are appropriately omitted and simplified. In each of the drawings, the same elements will be denoted by the same reference signs, and duplicate description will be omitted as necessary.

First Example Embodiment

Figure 1:
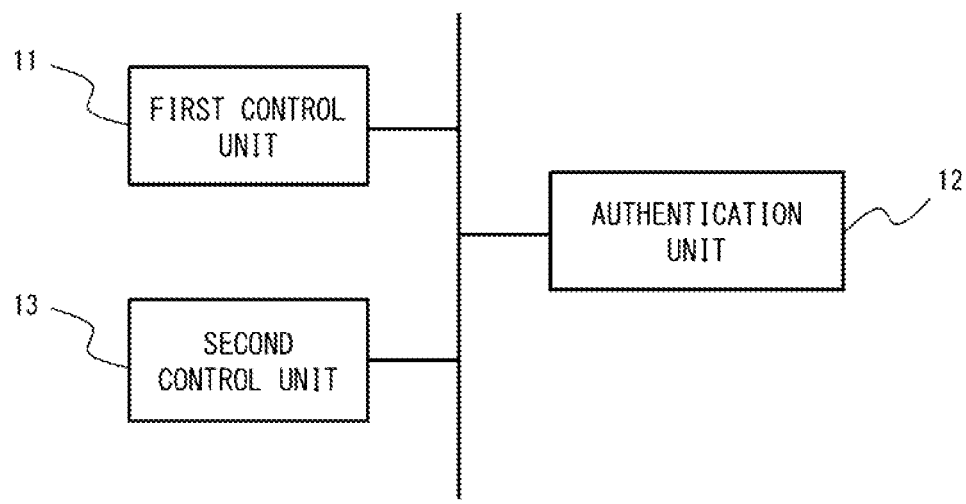
FIG. 1 is a configuration diagram illustrating a configuration example of an imaging system according to a first example embodiment.

FIG. 1 illustrates an outline of an imaging system according to a first example embodiment. As illustrated in FIG. 1, an imaging system (imaging device) 10 according to the example embodiment includes a first control unit 11, an authentication unit 12, and a second control unit 13.

The first control unit 11 controls, in such a way as to fix a focal position in a predetermined position (fixed focal position), a biometric camera for capturing an image focusing on a part (a part of a body that can be captured, such as an iris, a retina, eyelashes, a fingerprint, and an ear) of a target person. The authentication unit 12 authenticates the target person, based on a biometric image of the target person being captured by the biometric camera controlled by the first control unit 11. The second control unit 13 controls the biometric camera in such a way as to scan a focal position in a predetermined range (scanning range) in order to re-authenticate the target person when authentication of the target person fails. In the following example embodiment, an example of using irises as a part of a target person and using an iris camera as a biometric camera will be described.

In this way, in the example embodiment, re-authentication can be effectively performed by changing control (setting) of a focus of an iris camera (biometric camera) at a time of initial authentication and control (setting) of a focus of the iris camera at a time of re-authentication. Particularly, an iris of a target person is captured by fixing a focal position of the iris camera in initial authentication, and the iris of the target person is captured by scanning the focal position of the iris camera in re-authentication, and thus the iris can be more easily and reliably captured and the re-authentication can be performed.

Second Example Embodiment

Next, a second example embodiment will be described. In the example embodiment, the authentication unit 12 in the imaging system according to the first example embodiment determines whether a captured image can be used for authentication regardless of success and failure of the authentication. For example, in a case of a low resolution, a blur, overexposure, closed eyes, and the like in a captured image, it is determined that the captured image cannot be used for authentication. The second control unit 13 performs control on an iris camera in such a way as to scan a focal position in a predetermined range in order to re-authenticate a target person when the captured image cannot be used for the authentication. Also, in this case, the re-authentication can be effectively performed similarly to the first example embodiment.

Third Example Embodiment

Next, a third example embodiment will be described. In the example embodiment, in the imaging system according to the first or second example embodiment, the first control unit 11 performs control in such a way as to fix a focal position when a target person is authenticated in a first authentication mode, and the second control unit 13 performs control in such a way as to scan a focal position when the target person is authenticated in a second authentication mode. In this way, a focus of an iris camera can be appropriately controlled according to an authentication mode.

Fourth Example Embodiment

Next, a fourth example embodiment will be described. In the example embodiment, in the imaging system according to the third example embodiment, the first control unit 11 performs control in such a way as to fix a focal position in a case of an authentication mode of authenticating a target person while moving as a first authentication mode, and the second control unit 13 performs control in such a way as to scan a focal position in a case of an authentication mode of authenticating the target person while stopping as a second authentication mode. In this way, a focus of an iris camera can be appropriately controlled in each of the authentication mode of authenticating the target person while moving and the authentication mode of authenticating the target person while stopping.

Fifth Example Embodiment

Next, a fifth example embodiment will be described. The example embodiment is an example of performing re-authentication by changing setting of a focal position of an iris camera at a time of authentication failure in an imaging system that performs walk-through authentication. The walk-through authentication is an authentication method of authenticating a target person passing through the front of a camera while walking.

Figure 2:
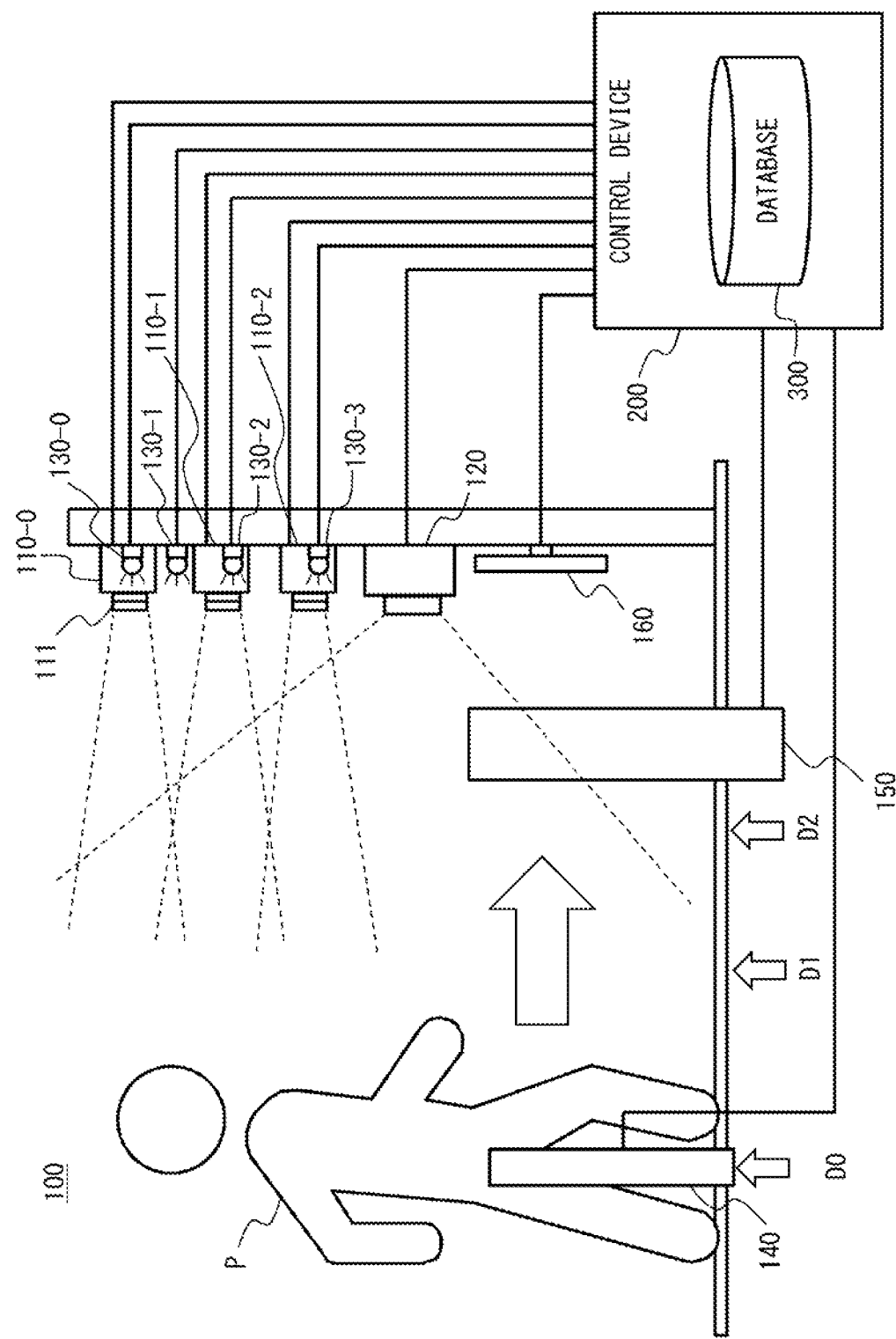
FIG. 2 is a configuration diagram illustrating a configuration example of an imaging system according to a fifth example embodiment.

FIG. 2 illustrates a configuration example of the imaging system according to the example embodiment. As illustrated in FIG. 2, the imaging system 100 includes a plurality of iris cameras 110, a wide field of view (WFOV) camera 120, a plurality of illumination devices 130, a human detection sensor 140, a gate 150, a display device 160, and a control device 200. The imaging system 100 authenticates a target person P walking toward the gate 150, and allows the target person P to pass through the gate 150 when authentication is successful.

The iris camera 110 is an iris imaging device for capturing irises of the target person P. A resolution of the iris camera 110 is a resolution with which an iris pattern of the target person P can be extracted, and an angle of view of the iris camera 110 is an angle of view including at least both eyes of the target person P. Note that the angle of view is a capturing area (visual field area) of a camera at a capturing point (position of a capturing target). The iris camera 110 is formed of a general-purpose camera of 12 M pixels (horizontal 4000 pixels, vertical 3000 pixels) and 60 fps, which is becoming a diffused product, such as an industrial camera, for example.

A position (height) of eyes of the target person P varies depending on a height of the target person P. Thus, for example, the plurality of iris cameras 110 are aligned in a vertical direction by height of the target person P. In this example, three iris cameras 110-0 to 110-2 are disposed, but the number is not limited to three, and any number of the iris cameras 110 may be disposed. For example, the number of iris cameras is set according to an angle of view, a resolution, and the like of the iris camera 110.

The iris camera 110 that may capture eyes of the target person P is selected from the iris cameras 110-0 to 110-2 by the control device 200, and an image (iris camera image) captured by the selected iris camera 110 is output to the control device 200. Herein, a capturing method of capturing the irises of the target person P by a camera selected from among the plurality of iris cameras 110 will be described, but a similar capturing method may be achieved by moving one iris camera 110 in the vertical direction. For example, a camera may be disposed in a position of the iris camera 110-0 in an initial state, and the camera may be moved in the vertical direction according to a position of the irises of the target person P during iris imaging. Note that an image captured by the iris camera 110 may be referred to as an iris camera image and an image focusing on irises of the iris camera image may be referred to as an iris image, but the iris camera image and the iris image can replace each other unless otherwise specified.

Further, a variable focus lens 111 is attached to each of the iris cameras 110. The variable focus lens 111 is, for example, a liquid lens, but may be another lens that can control a focal position. The liquid lens uses a change in curvature of a droplet by an input voltage, and can focus on a different depth position by changing an image formation position of an incident image on a lens. In the example embodiment, by setting a focal position of the variable focus lens 111 in response to control from the control device 200, the iris camera 110 performs "focus fixing burst imaging" that performs burst imaging by fixing a focal position or "focus scanning burst imaging" that performs burst imaging by scanning a focal position. Note that the burst imaging is capturing a specified number of images at a high frame rate and writing the images in a memory.

In the focus fixing burst imaging, the iris camera 110 performs the burst imaging (continuous imaging) while a focal position of the variable focus lens 111 is fixed in a predetermined position (fixed focusing position D1). In the focus scanning burst imaging, the iris camera 110 performs the burst imaging while scanning a focal position by moving a focal position of the variable focus lens 111 in the front-rear direction of the optical axis. For example, a depth of field (focusing range) of the iris camera 110 is about 1 cm and narrow. Thus, in a case of walk-through authentication, the burst imaging is performed on a target person passing through a fixed focal position by fixing a focus, and, in a case of re-authentication, the burst imaging is performed on the target person standing still by scanning a focus, and thus an iris image focusing on irises of the target person can be extracted.

The wide field of view camera 120 is a whole imaging device for capturing (commanding a wide field of view of) the target person P in an area wider than that of the iris camera 110. A resolution of the wide field of view camera 120 is a resolution that can recognize a face and eyes of the target person P. An angle of view of the wide field of view camera 120 is an angle of view (for example, including the angle of view of all of the iris cameras 110) in an area wider than that of the angle of view of the plurality of iris cameras 110, and is an angle of view that can cover an entire area from a tall target person to a short target person.

For example, the wide field of view camera 120 is disposed below the iris cameras 110-0 to 110-2 aligned in the vertical direction, but an arrangement position is not limited, and the wide field of view camera 120 may be disposed above the iris cameras 110-0 to 110-2. The wide field of view camera 120 outputs, to the control device 200, an image (wide field of view image) in which the target person P walking toward the gate 150 (target person passing through a trigger position D0) or the target person P standing still in a position (re-authentication position D2) in front of the gate 150 is captured.

The illumination device 130 is an illumination device that applies illumination light to the target person P in order to capture the irises of the target person P by the iris camera 110. For example, the illumination device 130 is a light emitting diode (LED) that applies near infrared light, or the like. The illumination device 130 applies (emits) illumination light at an amount of light and a timing in response to control from the control device 200. For example, light amount control information (light amount control value) that controls an amount of light includes a supply current value to an LED, a lighting time and a lighting cycle of the LED, and the like. Further, the plurality of illumination devices 130 are aligned in the vertical direction in such a way that the irises of the target person P can be captured with high accuracy. In this example, four illumination devices 130-0 to 130-3 are disposed, but the number is not limited to four, and any number of the illumination devices 130 may be disposed. Further, the illumination devices 130 may be aligned in a horizontal direction instead of the vertical direction, or may be aligned in the vertical direction and the horizontal direction.

The human detection sensor 140 is a detection sensor that can detect presence (passage) of a person, and is, for example, an infrared sensor. In this example, the human detection sensor 140 is installed in the trigger position D0 for starting authentication processing of the target person P by the imaging system 100. The human detection sensor 140 detects passage of the target person P through the trigger position D0, and outputs a detection signal indicating the detection of the target person P to the control device 200.

The gate 150 is an authentication gate such as a ticket gate through which the target person P passes, and is controlled to be opened and closed in response to an authentication result of the target person P. The display device 160 is a display device such as a liquid crystal display and an organic EL display, and is an output device that outputs an authentication result and the like of the target person P. Note that an authentication result and the like may be output by sound from a sound output means, such as a speaker, instead of the display device.

In the example embodiment, the control device 200 performs authentication of the target person P while the target person P walks from the trigger position D0 to the position of the gate 150, and opening and closing of the gate 150 and display of the display device 160 are controlled in response to an authentication result. The gate 150 and the display device 160 are also a guide device that guides the target person P to stand still in front of the gate 150 at a time of authentication failure of the walking target person P. Note that both of the gate 150 and the display device 160 may guide stop of the target person P, or one of the gate 150 and the display device 160 may guide stop of the target person P.

The control device 200 is a control device that controls an operation of each device of the imaging system 100, and performs processing needed for authentication of the target person P. In the example embodiment, the control device 200 performs walk-through authentication processing (first authentication processing) and further performs re-authentication processing (second authentication processing) at a time of authentication failure.

Further, the control device 200 includes a database 300 that registers iris information based on an iris image of a target person in order to authenticate the target person. The database 300 is a non-volatile memory such as a flash memory, a hard disk device, and the like, and may be included inside the control device 200 or may be included outside the control device 200.

Figure 3:
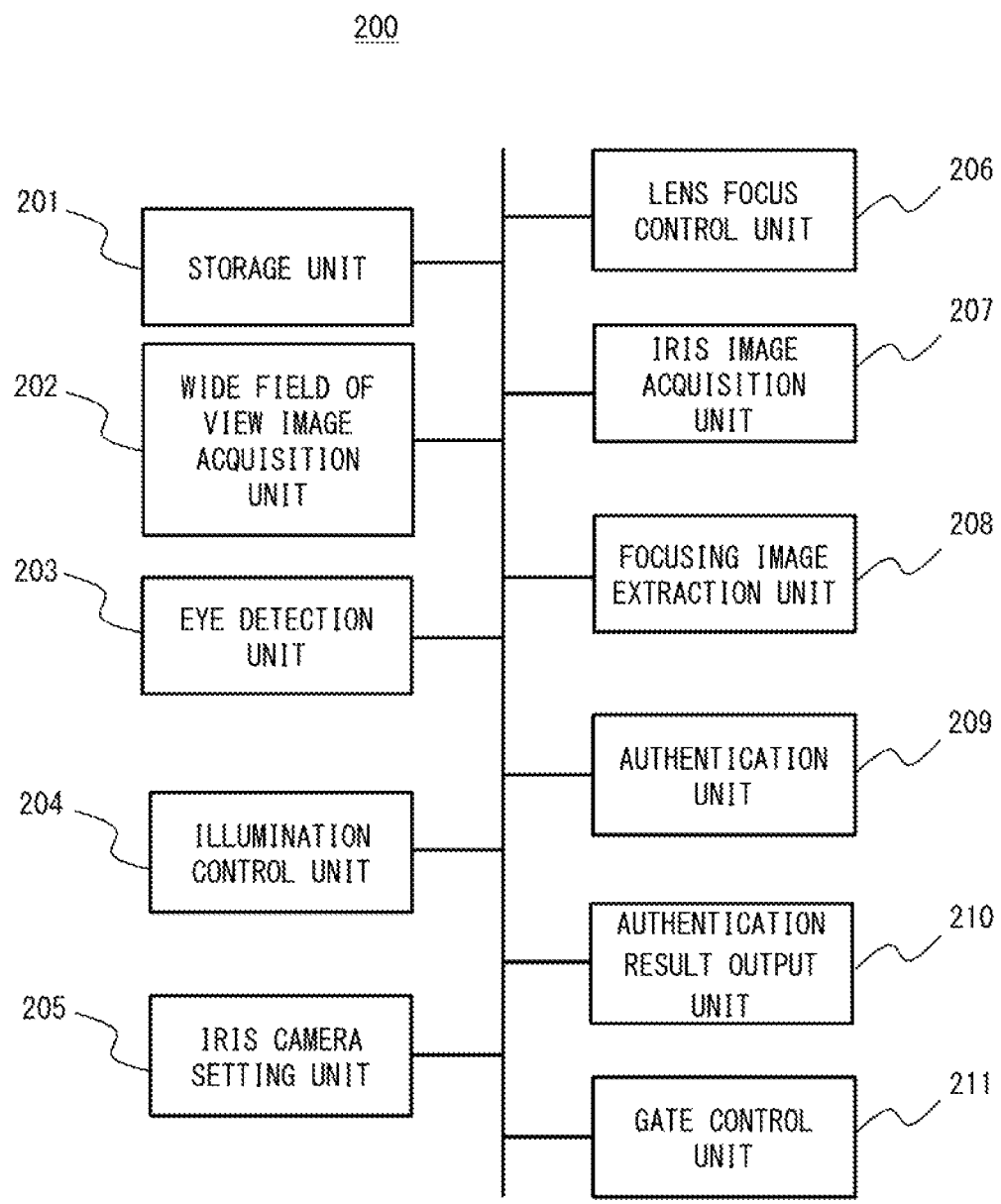
FIG. 3 is a configuration diagram illustrating a configuration example of a control device according to the fifth example embodiment.

FIG. 3 illustrates a configuration example of the control device according to the example embodiment. As illustrated in FIG. 3, the control device 200 includes a storage unit 201, a wide field of view image acquisition unit 202, an eye detection unit 203, an illumination control unit 204, an iris camera setting unit 205, a lens focus control unit 206, an iris image acquisition unit 207, a focusing image extraction unit 208, an authentication unit 209, an authentication result output unit 210, and a gate control unit 211. The control device 200 is achieved by a computer device such as a server and a personal computer, for example, but may be achieved by one device or may be achieved by a plurality of devices. For example, the illumination control unit 204, the gate control unit 211, and the like may be set as a device different from the control device 200.

The storage unit 201 stores information needed for processing of the control device 200. For example, the storage unit 201 stores a lens focus control value for controlling a focal position to a predetermined position, a light amount control value for controlling an amount of illumination light to a predetermined amount of light, a camera parameter of each camera, a transformation matrix that transforms a camera parameter (such as an angle of view) between the wide field of view camera 120 and the iris camera 110, and the like.

The wide field of view image acquisition unit 202 acquires a wide field of view image (wide field of view video) in which the wide field of view camera 120 captures the target person P. It can also be said that the wide field of view image acquisition unit 202 is a capturing unit that acquires an image (video) in which the wide field of view camera 120 captures the target person P walking toward the gate 150 or the target person P standing still in the position (re-authentication position D2) in front of the gate 150.

The eye detection unit 203 detects a region of eyes of the target person P from the wide field of view image being acquired by the wide field of view image acquisition unit 202. The eye detection unit 203 may directly detect a region of eyes from a wide field of view image, or may detect a region of a face from a wide field of view image and detect a region of eyes from the detected region of the face. For example, the eye detection unit 203 recognizes a pattern of a face from an image, extracts a region of the face, recognizes a pattern of an eye (iris) from the image, and extracts a region of the eye (iris).

The illumination control unit 204 controls application (emission) of illumination light of the plurality of illumination devices 130-0 to 130-3. For example, the illumination control unit 204 sets, for the plurality of illumination devices 130-0 to 130-3, a predetermined light amount control value being stored in advance in the storage unit 201.

The iris camera setting unit 205 performs setting needed for capturing the irises of the target person P on any of the plurality of iris cameras 110, based on a position of the region of the eyes in the wide field of view image being detected by the eye detection unit 203. The iris camera setting unit 205 selects the iris camera 110 associated with the position of the eyes in the wide field of view image, and sets a region of interest (ROI) at an angle of view of the selected iris camera 110. The ROI is a region (iris imaging region) for capturing both eyes of the target person P within an angle of view of the iris camera 110.

The lens focus control unit 206 drives the variable focus lens 111 of the iris camera 110 selected by the iris camera setting unit 205, and sets a focal position of the iris camera 110. For example, at a time of walk-through authentication, a fixed focal position is set for the iris camera 110 in such a way as to perform the focus fixing burst imaging, and, at a time of re-authentication, a focus scanning range is set for the iris camera 110 in such a way as to perform the focus scanning burst imaging. It can also be said that the lens focus control unit 206 is a first control unit that performs control in such a way as to fix a focus of the iris camera 110 and a second control unit that performs control in such a way as to scan a focus of the iris camera 110.

The iris image acquisition unit 207 acquires an iris camera image (iris image) captured by the iris camera 110 being selected and set by the iris camera setting unit 205. It can also be said that the iris image acquisition unit 207 is a capturing unit that acquires an image captured in an area of the ROI by the iris camera 110. The iris image acquisition unit 207 acquires a plurality of iris camera images acquired by performing continuous imaging on the ROI by the focus fixing burst imaging at a time of walk-through authentication, and acquires a plurality of iris camera images acquired by performing continuous imaging on the ROI by the focus scanning burst imaging at a time of re-authentication. The focusing image extraction unit 208 extracts an iris image focusing on the irises from among the plurality of iris camera images acquired by the iris image acquisition unit 207.

The authentication unit 209 performs authentication processing of the target person P by using the iris image extracted by the focusing image extraction unit 208. For example, the authentication unit 209 performs authentication of the target person by comparing iris information based on the iris image extracted by the focusing image extraction unit 208 with iris information registered in the database 300.

For example, the authentication processing includes an evaluation of an imaging state of irises and verification of iris information being extracted from an iris image. The authentication unit 209 determines authentication success when an imaging state of irises is successful (imaging success) and a verification result of iris information is successful (verification success). Further, the authentication unit 209 determines authentication failure when an imaging state of irises fails (imaging failure) and a verification result of iris information fails (verification failure).

The authentication result output unit 210 displays (outputs) an authentication result by the authentication unit 209 on the display device 160. The authentication result output unit 210 displays authentication success or authentication failure on the display device 160, and performs display for guiding the target person P to stand still at a time of the authentication failure. Note that, at a time of the authentication failure, imaging failure or verification failure may be displayed in such a way as to be able to recognize a failure factor. The gate control unit 211 controls opening and closing of the gate 150 in response to the authentication result of the authentication unit 209. The gate control unit 211 opens the gate 150 at a time of the authentication success, and closes the gate 150 at a time of the authentication failure.

Figure 4:
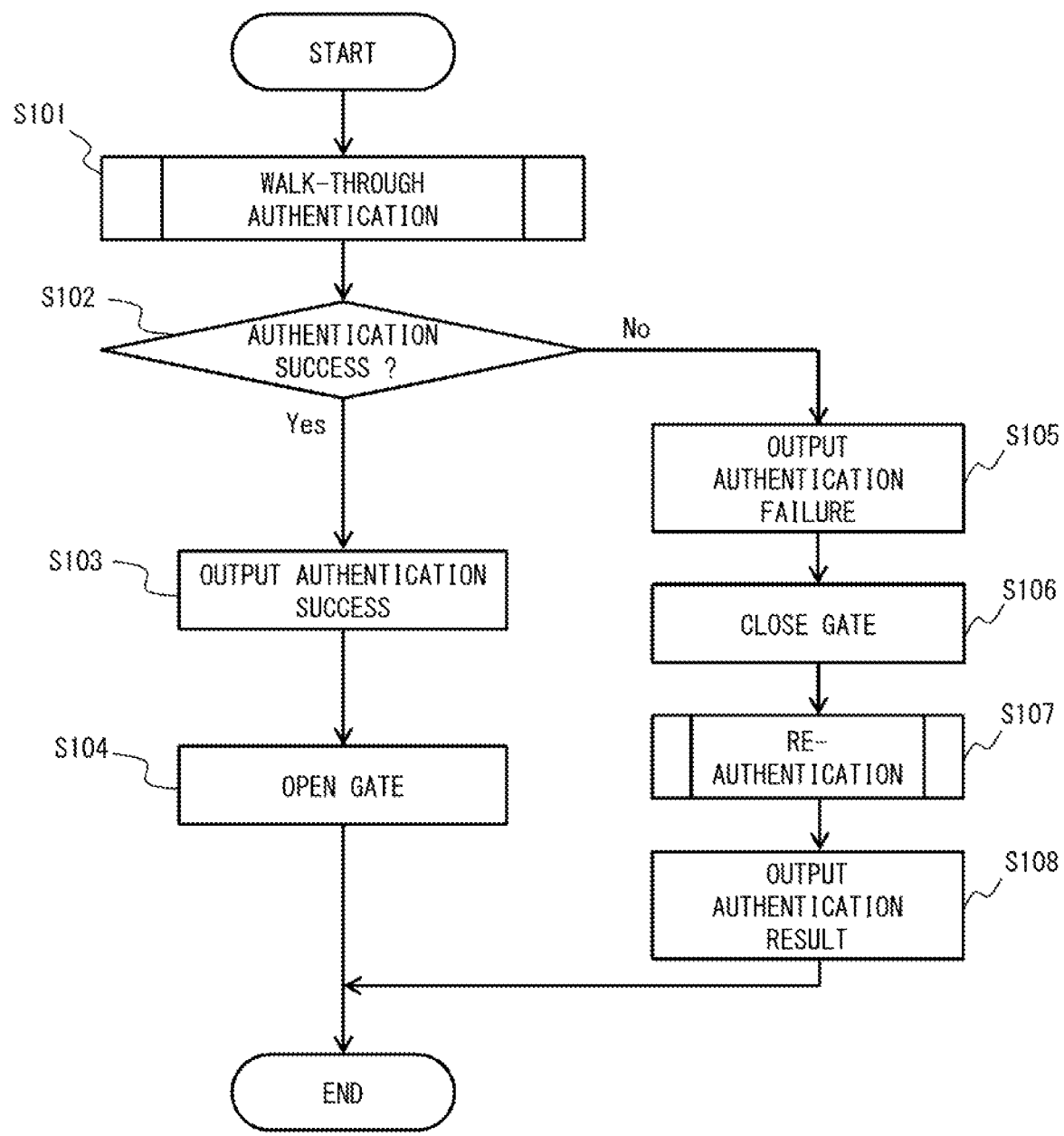
FIG. 4 is a flowchart illustrating an operation example of the imaging system according to the fifth example embodiment.

FIG. 4 illustrates an operation example of the imaging system according to the example embodiment. As illustrated in FIG. 4, first, the control device 200 performs walk-through authentication processing on the target person P who is walking (S101).

Figure 5:
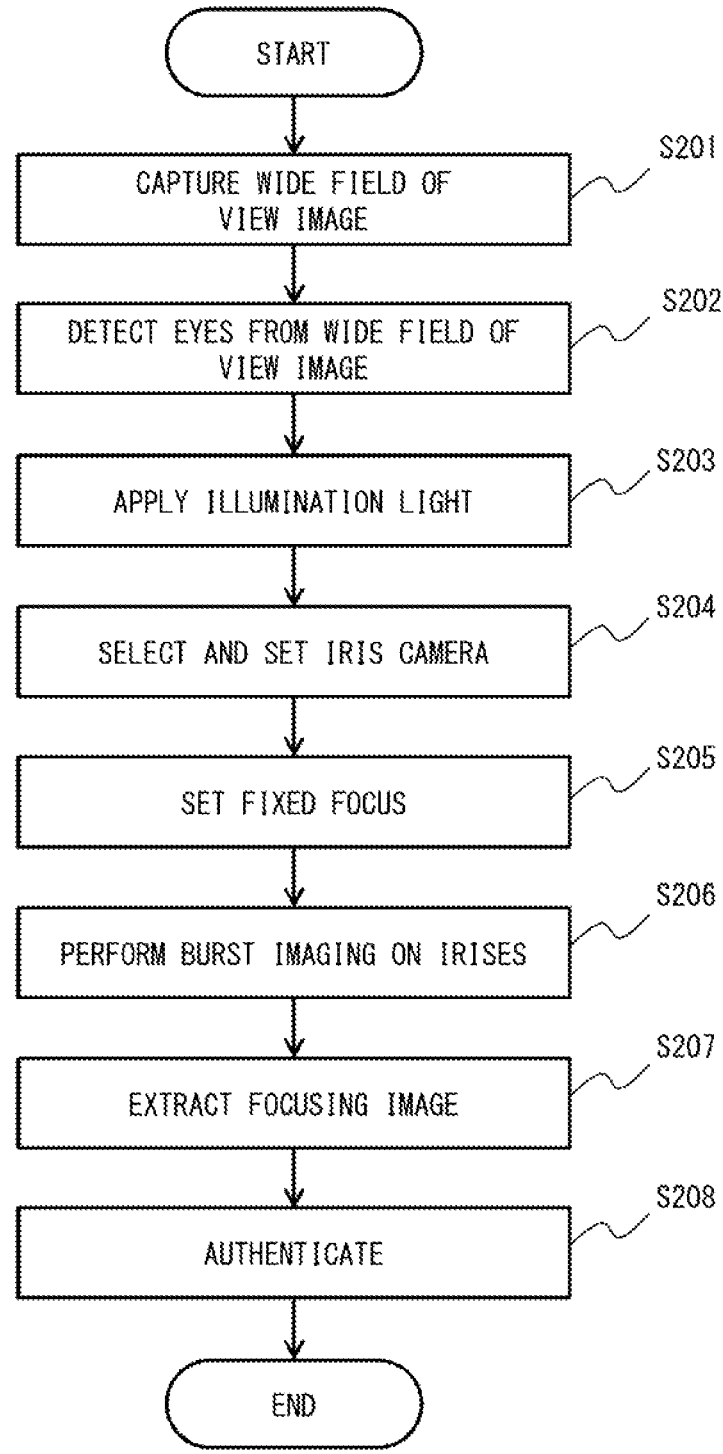
FIG. 5 is a flowchart illustrating an example of walk-through authentication processing according to the fifth example embodiment.

FIG. 5 illustrates a specific example of the walk-through authentication processing (S101) in FIG. 4. As illustrated in FIG. 5, first, the wide field of view camera 120 captures a wide field of view image including the walking target person P (S201). For example, when the target person P passes through the trigger position D0, the human detection sensor 140 detects the target person P, and outputs a detection signal indicating the detection of the target person P to the control device 200. When the wide field of view image acquisition unit 202 receives the detection signal from the human detection sensor 140, the wide field of view image acquisition unit 202 instructs an imaging start to the wide field of view camera 120, and acquires a wide field of view image including the target person P from the wide field of view camera 120.

Then, the control device 200 detects a position of eyes of the target person P from the captured wide field of view image (S202). When the wide field of view image is acquired from the wide field of view camera 120, the eye detection unit 203 detects the eyes of the target person P in the wide field of view image. For example, when a face is detected, the eye detection unit 203 detects a region of the face by extracting an edge (contour) from a wide field of view image, and matching an image pattern of a region surrounded by the extracted edge with a predetermined image pattern of the face. Furthermore, the eye detection unit 203 extracts a pattern of eyes (irises) from an image of a region of a face or a wide field of view image. For example, processing of extracting a circular pattern from a target image is performed, and a position of the extracted circle is detected as a position of an eye (iris).

Then, the illumination device 130 applies illumination light to the target person P (S203). A timing at which the illumination device 130 starts application of illumination light is any timing since the target person P passes through the trigger position D0 until the iris camera 110 starts imaging. For example, after the human detection sensor 140 detects the target person P or after the eyes of the target person P are detected, the illumination control unit 204 sets a predetermined light amount control value for the plurality of illumination devices 130-0 to 130-3, and performs control in such a way as to start application at a predetermined amount of light.

Then, the control device 200 performs selection and setting of the iris camera 110 (S204). When the eyes of the target person P are detected from the wide field of view image, the iris camera setting unit 205 transforms coordinates of the eyes in the wide field of view image (angle of view of the wide field of view camera) into coordinates in an iris camera image (angle of view of the iris camera) of the iris camera 110 in order to select a suitable iris camera 110. At this time, the coordinates of the eyes are transformed by using a coordinate transformation matrix being acquired in advance on an assumption that the target person P is present in the fixed focusing position D1. The iris camera setting unit 205 selects the iris camera 110 associated with an angle of view including the coordinates of the eyes after the transformation, and further sets the ROI in such a way as to include the coordinates of the eyes after the transformation.

Then, the control device 200 sets a focal position of the iris camera 110 as a fixed focus (S205). When selection of the iris camera 110 and setting of the ROI are performed, the lens focus control unit 206 sets a focal position of the variable focus lens 111 of the iris camera 110 being selected and set. The lens focus control unit 206 sets, in a fixed focusing position, the focal position of the variable focus lens 111 in such a way as to perform the focus fixing burst imaging at a time of walk-through authentication.

Then, the iris camera 110 performs the burst imaging on irises of the walking target person P (S206). The iris camera setting unit 205 performs selection of the iris camera 110 and setting of the ROI, and also outputs a trigger of an imaging start to the iris camera 110. Furthermore, the lens focus control unit 206 sets, in a fixed position, the focal position of the variable focus lens 111 of the selected iris camera 110. Then, the iris camera 110 starts the burst imaging on the ROI in the fixed focal position, and outputs a captured iris camera image (burst image) to the control device 200.

Figure 6:
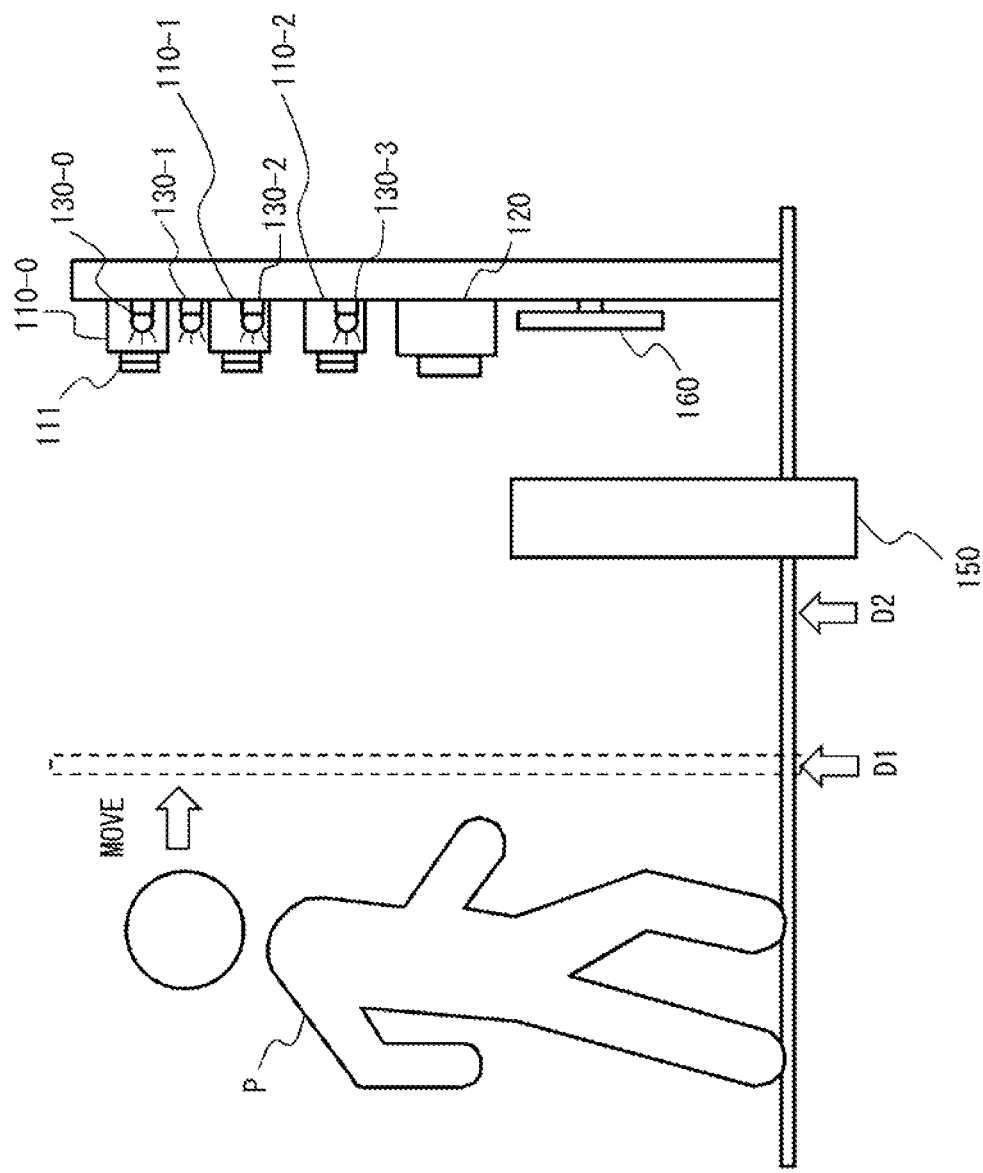
FIG. 6 is a diagram for describing an operation at a time of walk-through authentication according to the fifth example embodiment.

In other words, as illustrated in FIG. 6, in a state where a focus of the iris camera 110 is fixed in the fixed focusing position D1, the burst imaging (focus fixing burst imaging) is performed in a predetermined period on the target person P who is approaching the fixed focusing position D1 and passing through the fixed focusing position D1. In this way, as the target person P approaches the fixed focusing position D1, an image focusing on the irises can be acquired.

Then, the control device 200 extracts an iris image focusing on the irises (S207). When the iris camera 110 outputs a burst image (iris camera image) acquired by performing the burst imaging on the target person P, the iris image acquisition unit 207 acquires a plurality of captured iris camera images, and the focusing image extraction unit 208 extracts an iris image focusing on the irises of the target person P from among the plurality of acquired iris camera images. The focusing image extraction unit 208 evaluates focusing of the plurality of iris camera images, and extracts an iris image focusing the most. For example, an image having the greatest contrast is detected from the plurality of iris camera images, and the detected image is extracted as a focusing iris image.

Then, the control device 200 performs authentication of the target person P (S208). When the focusing iris image is extracted, the authentication unit 209 performs authentication processing, based on the extracted iris image. Note that a feature value extracted from the iris image of the target person is registered in advance in the database 300.

The authentication unit 209 performs, as the authentication processing, evaluation processing of an imaging state of the irises and verification processing of iris information. For example, the authentication unit 209 detects an inner circle inside the iris and an outer circle outside the iris in the iris image, and detects a doughnut-shaped iris area. The authentication unit 209 determines imaging success when the authentication unit 209 can detect the iris area from the iris image, and determines imaging failure when the authentication unit 209 cannot detect the iris area from the iris image. Note that imaging failure may be determined when the focusing iris image cannot be acquired in S207.

Furthermore, the authentication unit 209 extracts a feature value of the irises by segmenting the iris area detected from the iris image and converting acquired brightness into a numerical form. The authentication unit 209 verifies the feature value extracted from the iris image with the feature value registered in the database 300, and determines coincidence or non-coincidence, based on a similarity score. The authentication unit 209 determines verification success when the feature value extracted from the iris image coincides with the feature value in the database 300, and determines verification failure when the feature value extracted from the iris image does not coincide with the feature value in the database 300.

When the walk-through authentication processing ends, as illustrated in FIG. 4, the control device 200 determines whether the authentication of the target person P is successful (S102), and, when the authentication is successful, the control device 200 outputs authentication success to the display device 160 (S103) and opens the gate 150 (S104). When the authentication is successful in the walk-through authentication (when imaging of the irises and verification are successful), the authentication result output unit 210 displays (outputs) a character, a mark, and the like indicating authentication success on the display device 160. Furthermore, the gate control unit 211 performs control in such a way to open the gate 150. In this way, the target person P can pass through the gate 150.

On the other hand, when the authentication fails in the walk-through authentication (when imaging of the irises and verification fail), the control device 200 outputs authentication failure to the display device 160 (S105) and closes the gate 150 (S106). In this case, the authentication result output unit 210 displays (outputs) a character, a mark, and the like indicating authentication failure on the display device 160. Furthermore, the gate control unit 211 performs control in such a way to close the gate 150. In this way, the target person P can be guided to stop in the re-authentication position D2 in front of the gate 150. For example, "stop in front of gate" may be displayed as a guide on the display device 160.

Figure 7:
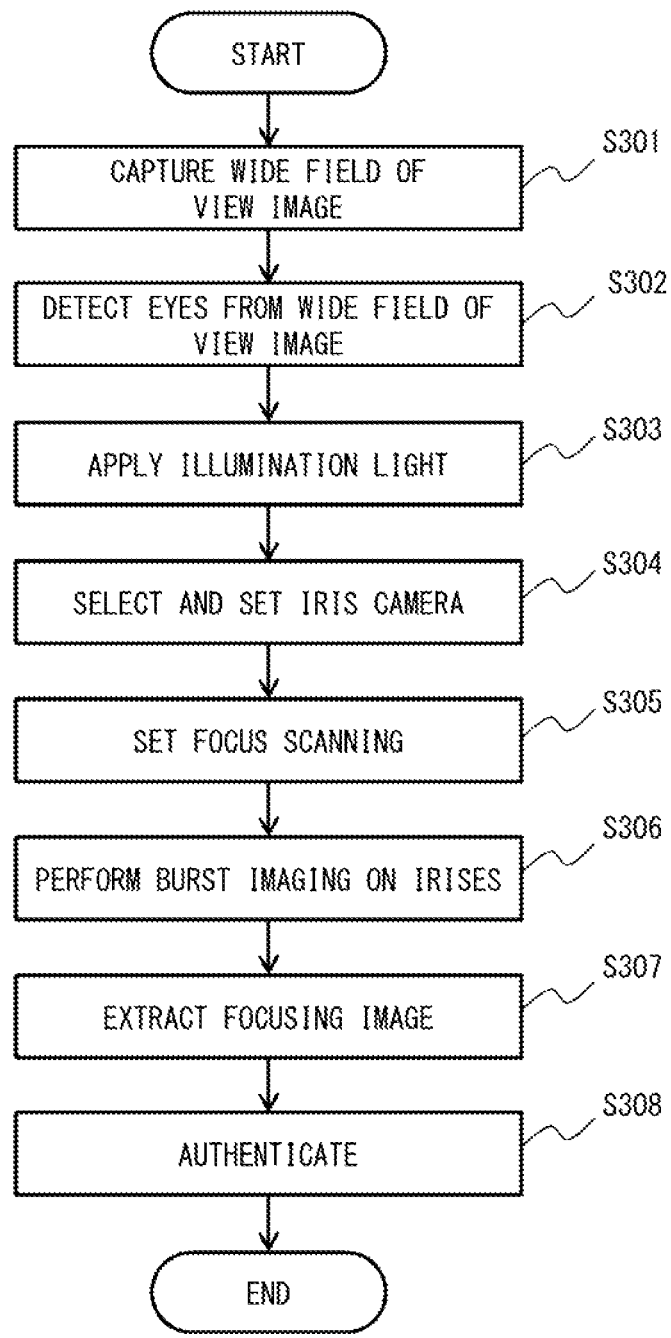
FIG. 7 is a flowchart illustrating an example of re-authentication processing according to the fifth example embodiment.

Then, the control device 200 performs re-authentication processing on the target person P who is standing still (S107). FIG. 7 illustrates a specific example of the re-authentication processing (S107) in FIG. 4. Note that, in FIG. 7, S301 to S304 and S306 to S308 are basically similar to S201 to S204 and S206 to S208 in FIG. 5.

In other words, when the authentication of the target person P fails in the walk-through authentication, the wide field of view camera 120 captures a wide field of view image including the target person P standing still in the re-authentication position D2 (S301), and the control device 200 detects a position of the eyes of the target person P from the captured wide field of view image (S302). Further, the illumination device 130 applies a predetermined amount of illumination light to the target person P (S303).

Then, the control device 200 performs selection and setting of the iris camera 110 (S304). The iris camera setting unit 205 transforms coordinates of the eyes in the wide field of view image into coordinates in an iris camera image by using a coordinate transformation matrix being acquired in advance on an assumption that the target person P is present in the re-authentication position D2. Furthermore, the iris camera setting unit 205 performs selection of the iris camera 110 and setting of the ROI by using the transformed coordinates.

For example, the re-authentication position D2 is a predetermined position in front of the gate 150. Note that the example embodiment is not limited to a predetermined position, and a position of the target person P may be measured by using a depth sensor, a human detection sensor, or the like, and the measured position may be used as the re-authentication position D2 in the re-authentication processing. A position of D2 may be predicted from a position of the trigger position D0, time (time at which the target person passes), and a walking speed (predetermined walking speed) of the target person P.

Then, the control device 200 performs setting in such a way as to perform focus scanning on a focal position of the iris camera 110 (S305). When the iris camera setting unit 205 performs selection of the iris camera 110 and setting of the ROI, the lens focus control unit 206 sets a focal position of the variable focus lens 111 of the iris camera 110 being selected and set. The lens focus control unit 206 sets a scanning range of a focus for the variable focus lens 111 in such a way as to perform the focus scanning burst imaging at a time of re-authentication. For example, the scanning range is a predetermined range from a scanning start position to a scanning end position of a focus, including the predetermined re-authentication position D2. In other words, the scanning range is a range (focal position) according to a position of the target person P.

Then, the iris camera 110 performs the burst imaging on irises of the walking target person P (S306). The iris camera setting unit 205 performs selection of the iris camera 110 and setting of the ROI, and also outputs a trigger of an imaging start to the iris camera 110. Furthermore, the lens focus control unit 206 starts focus scanning driving of the variable focus lens 111 of the selected iris camera 110. Then, the iris camera 110 starts the burst imaging on the ROI in the predetermined scanning range, and outputs a captured iris camera image (burst image) to the control device 200.

Figure 8:
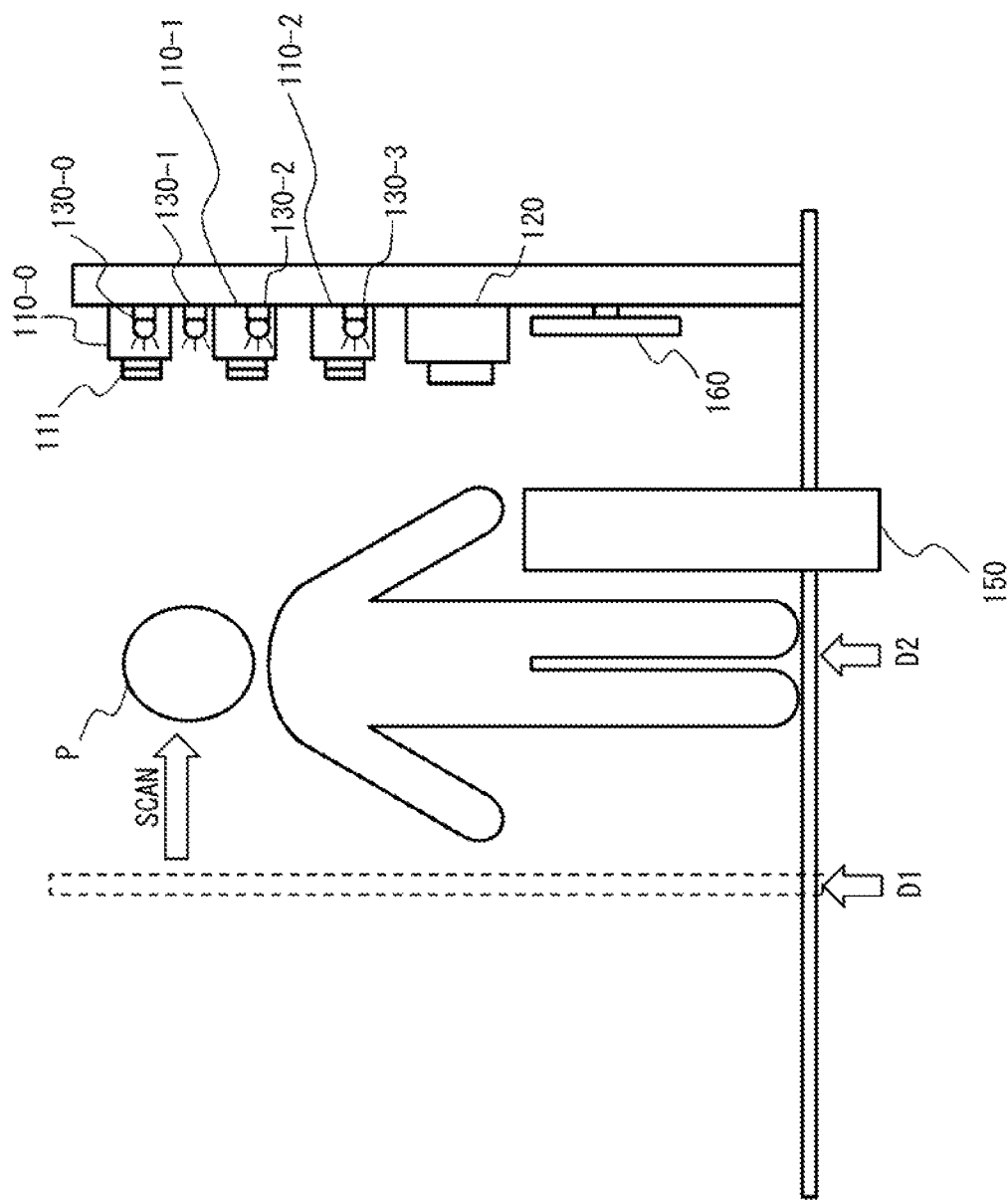
FIG. 8 is a diagram for describing an operation at a time of re-authentication according to the fifth example embodiment.

In other words, as illustrated in FIG. 8, while scanning a focus of the iris camera 110 in the scanning range including the re-authentication position D2, the burst imaging (focus scanning burst imaging) is performed on the target person P standing in the re-authentication position D2. In this way, an image focusing on the irises of the target person P can be acquired in the predetermined scanning range.

Then, the control device 200 extracts an iris image focusing on the irises (S307), and performs authentication of the target person P (S308). When the re-authentication processing ends, as illustrated in FIG. 4, the control device 200 outputs a result of the re-authentication (S108). For example, similarly to S103 and S105, an authentication result is output to the display device 160. Further, similarly to S104 and S106, opening and closing of the gate 150 may be controlled.

As described above, in the example embodiment, at a time of walk-through authentication, the burst imaging is performed on a target person passing through a fixed focal position with a focal position of an iris camera being fixed, and, at a time of re-authentication when authentication fails, the burst imaging is performed on a target person who is standing still by scanning the focal position of the iris camera. In this way, at a time of authentication failure, the target person can be smoothly re-authenticated, and the re-authentication processing can be performed by more reliably capturing an iris image.

For example, in a related system, even with iris information about a target person being registered in advance, when imaging fails in such a way that the target person blinks, looks away, does not know an authentication method, or the like, the target person needs to move to a different gate for re-authentication and be re-authenticated, or needs to pass through the same gate again and be re-authenticated. Thus, in the related system, a re-authentication gate needs to be installed, and a path for returning to the same gate needs to be secured. At a time of authentication failure, passing through a gate again is not a smooth authentication process for a target person. Thus, in the example embodiment, when walk-through authentication fails, a target person is made to stand still in front of a gate, and re-authentication is then performed by changing setting of an iris camera. In this way, a re-authentication gate does not need to be provided, and the same gate does not need to be passed again. Therefore, complicatedness of an authentication process at a time of re-authentication can be suppressed, and the re-authentication can be smoothly performed. Further, since the re-authentication is performed by changing setting of the same iris camera, an installation place and the number of cameras do not need to be increased.

Sixth Example Embodiment

Next, a sixth example embodiment will be described. The example embodiment is an example of performing re-authentication by changing an angle of view and an imaging direction of an iris camera at a time of re-authentication in the imaging system in the fifth example embodiment. A configuration of an imaging system and a configuration of a control device according to the example embodiment are similar to those in the fifth example embodiment, and an operation at a time of walk-through authentication is also similar to that in the fifth example embodiment.

Figure 9:
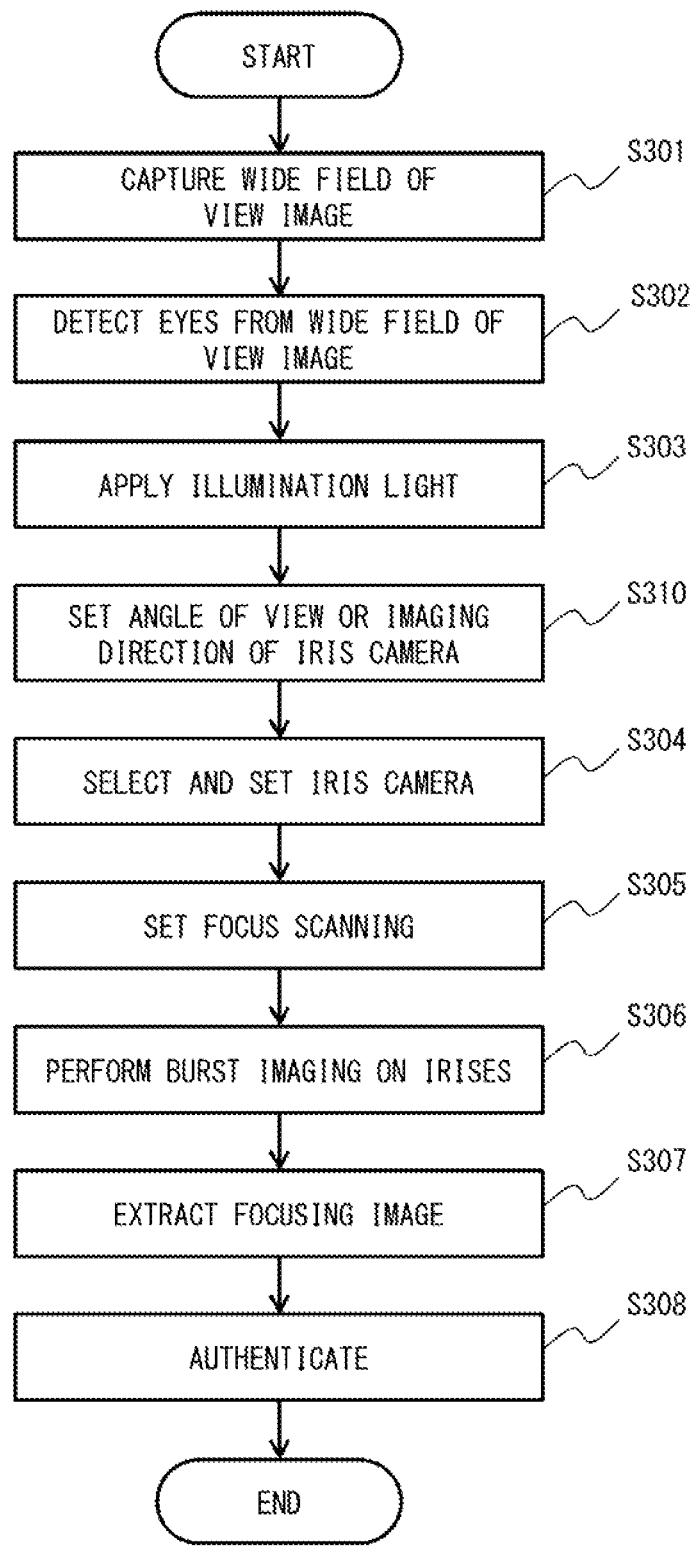
FIG. 9 is a flowchart illustrating an example of re-authentication processing according to a sixth example embodiment.

FIG. 9 illustrates re-authentication processing according to the example embodiment. In FIG. 9, as compared to the processing in FIG. 7 in the fifth example embodiment, setting processing of an angle of view or an imaging direction of an iris camera (S310) is added.

Figure 10:
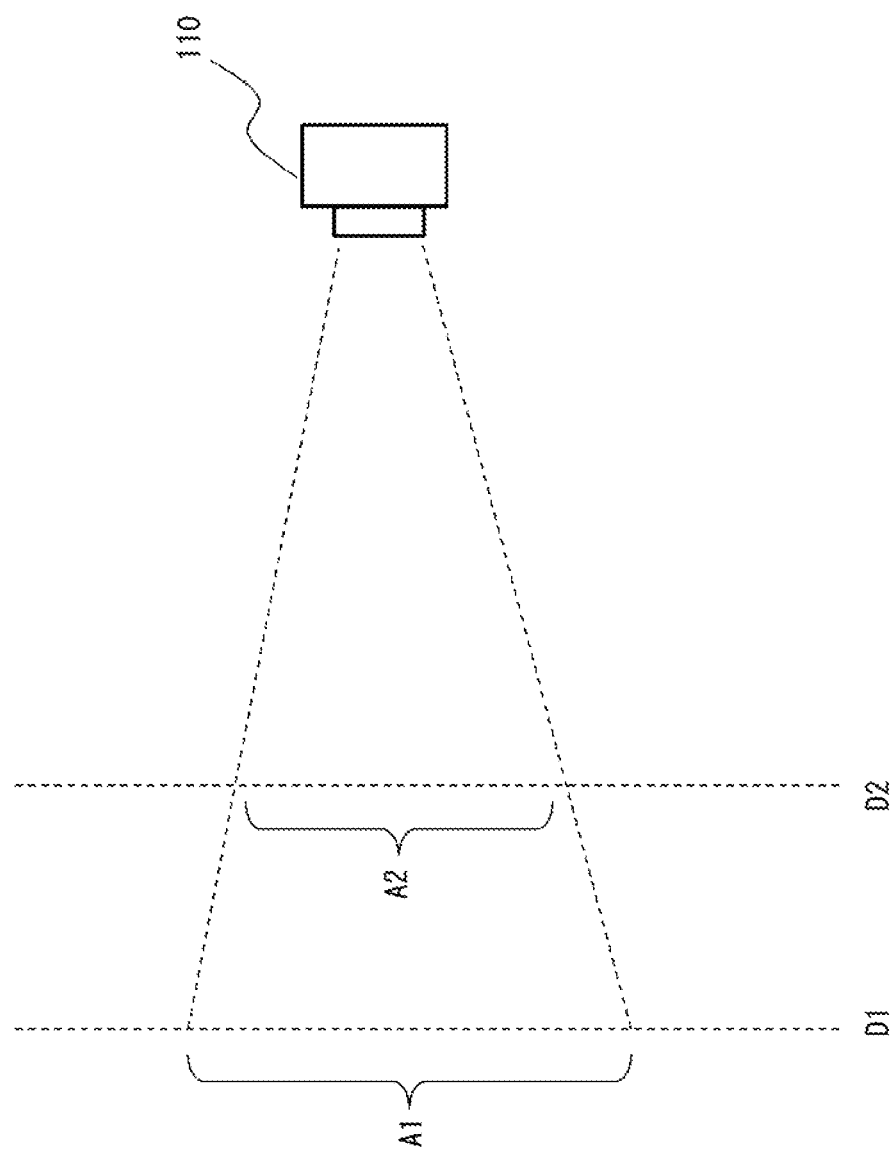
FIG. 10 is a diagram for describing a setting example of an iris camera according to the sixth example embodiment.

In other words, in the re-authentication processing according to the example embodiment, similarly to FIG. 7, imaging of a wide field of view image (S301), detection of eyes (S302), and application of illumination light (S303) are performed. Then, a control device 200 sets an angle of view or an imaging direction of an iris camera 110 (S310). As illustrated in FIG. 10, since a fixed focusing position D1 at a time of walk-through authentication and a re-authentication position D2 at a time of re-authentication have different distances from the iris camera 110, the angle of view of the iris camera 110 changes. In other words, since the re-authentication position D2 is closer to the iris camera 110 than the fixed focusing position D1, an angle of view A2 in the re-authentication position D2 is narrower than an angle of view A1 in the fixed focusing position D1. Then, when the iris camera 110 is selected and an ROI is set in the re-authentication position D2 without changing the angle of view A1 in the fixed focusing position D1, there is a risk that eyes of a target person cannot be accurately captured. Thus, an iris camera setting unit 205 sets, as an angle of view of the iris camera 110, an angle of view according to the predetermined re-authentication position D2 (position of a target person P). As a method of setting (changing) an angle of view, a lens focal distance of a camera may be changed by using a controllable zoom lens or the like, for example. Note that the lens focal distance is a parameter of a lens for determining an angle of view at which imaging can be performed by a camera.

Figure 11:
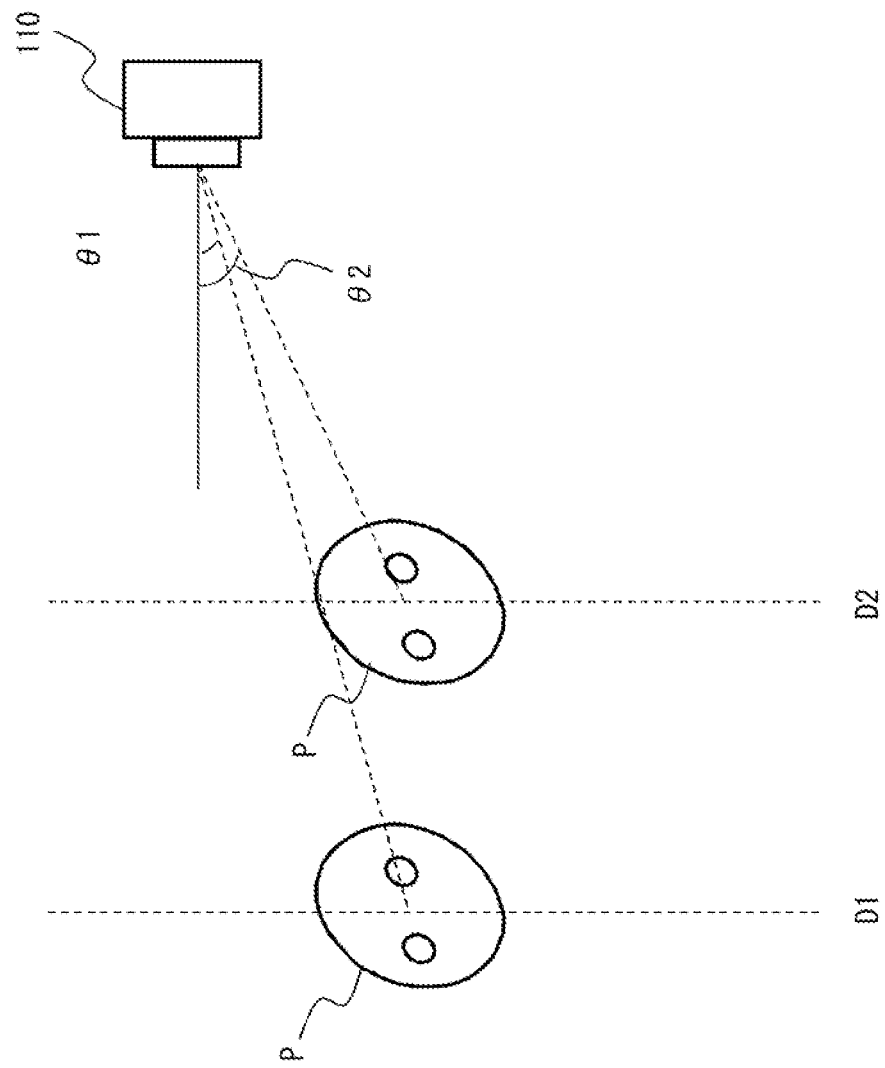
FIG. 11 is a diagram for describing a setting example of the iris camera according to the sixth example embodiment.

Further, instead of an angle of view, an imaging direction of the iris camera 110 may be changed. For example, as illustrated in FIG. 11, angles at which eyes of the target person P are viewed from the iris camera 110 are different in the fixed focusing position D1 and the re-authentication position D2. For example, when angles (angles with respect to the horizontal direction) viewed from the iris camera 110 in the fixed focusing position D1 and the re-authentication position D2 are θ1 and θ2, respectively, θ2 is greater than θ1. Then, similarly to an angle of view, when imaging is performed in the re-authentication position D2 in the same imaging direction as that in the fixed focusing position D1, there is a risk that the eyes of the target person cannot be accurately captured. Thus, the iris camera setting unit 205 sets, as an imaging direction of the iris camera 110, an imaging direction according to the predetermined re-authentication position D2 (position of the target person P). For a change in imaging direction, an orientation of a camera itself may be changed, or an orientation of an optical axis may be changed by using a mirror or the like.

Then, the control device 200 performs selection and setting of the iris camera 110 (S304). The iris camera setting unit 205 transforms coordinates of eyes in a wide field of view image into coordinates in an iris camera image, based on the angle of view or the imaging direction of the iris camera being set as described above, and selects the iris camera 110 and sets the ROI by using the transformed coordinates. For example, coordinate transformation may be performed by using a coordinate transformation matrix according to angle of view and an imaging direction. Then, similarly to the fifth example embodiment, the iris camera 110 captures irises of the target person, and authenticates the target person (S305 to S308).

As described above, in the example embodiment, an angle of view and an imaging direction of an iris camera are further changed at a time of re-authentication. Since an angle of view and an angle from a camera change between a time of walk-through authentication and the time of the re-authentication, by appropriately setting an angle of view and an imaging direction at the time of the re-authentication, irises of a target person can be more reliably captured at the time of the re-authentication, and accuracy of re-authentication processing can be further improved.

Seventh Example Embodiment

Next, a seventh example embodiment will be described. The example embodiment is an example of performing re-authentication by changing an amount of illumination light at a time of re-authentication in the imaging system in the fifth or sixth example embodiment. A configuration of an imaging system and a configuration of a control device according to the example embodiment are similar to those in the fifth or sixth example embodiment, and an operation at a time of walk-through authentication is also similar to that in the fifth or sixth example embodiment.

Figure 12:
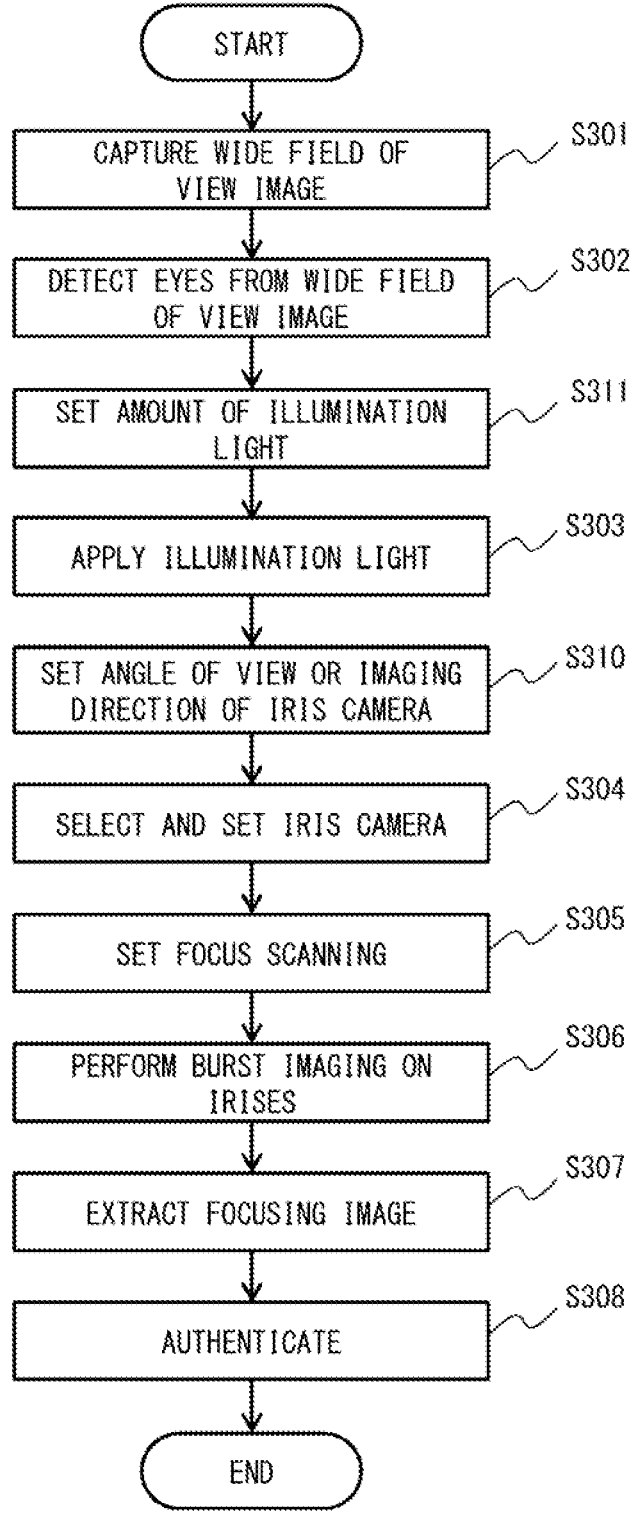
FIG. 12 is a flowchart illustrating an example of re-authentication processing according to a seventh example embodiment.

FIG. 12 illustrates re-authentication processing according to the example embodiment. In FIG. 12, as compared to the processing in FIG. 9 in the sixth example embodiment, light amount setting processing of illumination light (S311) is added. Note that, in this example, the example embodiment is applied to the re-authentication processing in the sixth example embodiment, but the example embodiment may be applied to the re-authentication processing in the fifth example embodiment.

In other words, in the re-authentication processing according to the example embodiment, similarly to FIG. 9, imaging of a wide field of view image (S301) and detection of eyes (S302) are performed. Then, a control device 200 sets an amount of illumination light (S311). Since a fixed focusing position D1 at a time of walk-through authentication and a re-authentication position D2 at a time of re-authentication have different distances from an illumination device 130, intensity (brightness) by illumination light changes. Then, when imaging is performed in the re-authentication position D2 at the same amount of illumination light as that in the fixed focusing position D1, there is a risk that a feature value cannot be accurately extracted from an iris image of a target person. Thus, an illumination control unit 204 sets, as an amount of light of a plurality of the illumination devices 130, an amount of light according to the predetermined re-authentication position D2 (position of a target person P). Then, illumination light having the set amount of light is applied to the target person (S303), and, similarly to the sixth example embodiment, the iris camera 110 captures irises of the target person, and authenticates the target person (S301 and S304 to S308).

As described above, in the example embodiment, an amount of illumination light is further changed at a time of re-authentication. Since intensity of illumination light changes between a time of walk-through authentication and the time of the re-authentication, by appropriately setting the amount of illumination light at the time of the re-authentication, accuracy of re-authentication processing can be further improved. Note that, at the time of the re-authentication, not only an amount of illumination light but also an irradiation direction of illumination light may be changed according to a re-authentication position.

Other Example Embodiment

For example, in the imaging system according to any of the fifth to seventh example embodiments, imaging of a wide field of view image may not be performed at a time of re-authentication. In other words, in the re-authentication processing in FIGS. 7, 9, and 12, imaging of a wide field of view image (S301) and detection of eyes (S302) may be omitted.

In this case, in S304, selection and setting of the iris camera 110 may be performed based on a position of eyes detected from a wide field of view image at a time of walk-through authentication. When coordinates of the eyes detected from the wide field of view image at the time of the walk-through authentication are transformed into coordinates in an iris camera image at a time of re-authentication, there is a risk that irises of the target person P in the re-authentication position D2 cannot be accurately captured. Thus, a position of the eyes in the wide field of view image in the re-authentication position D2 is preferably predicted from a position of the eyes detected from the wide field of view image at the time of the walk-through authentication. For example, a position of the eyes in the wide field of view image in the re-authentication position D2 can be predicted according to a distance from a position (trigger position D0) in which the wide field of view image is captured to the re-authentication position D2. The predicted coordinates of the eyes in the wide field of view image are transformed into coordinates in an iris camera image, and selection of the iris camera 110 and setting of the ROI are performed by using the transformed coordinates.

Note that the disclosure is not limited to the example embodiments described above, and may be appropriately modified without departing from the scope of the disclosure.

Figure 13:
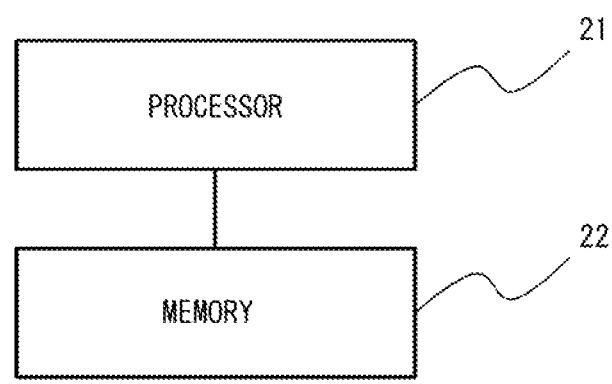
FIG. 13 is a configuration diagram illustrating an outline of hardware of a computer according to the example embodiment.

Further, each configuration in the example embodiments described above is formed of hardware, software, or both, and may be formed of one piece of hardware or one piece of software, or may be formed of a plurality of pieces of hardware or a plurality of pieces of software. Each device and each function (processing) may be achieved by a computer 20 including a processor 21 and a memory 22 being a storage device as illustrated in FIG. 13. For example, a program for performing a method (for example, a capturing method in a control device) in the example embodiment may be stored in the memory 22, and each function may be achieved by executing the program stored in the memory 22 by the processor 21. Note that, as the processor 21, a central processing unit (CPU), a graphics processing unit (GPU), a field-programmable gate array (FPGA), a digital signal processor (DSP), an application specific integrated circuit (ASIC), and the like may be used. Further, a plurality thereof may be used in parallel.

Further, the programs are stored by using a non-transitory computer-readable medium of various types, and can be supplied to a computer. The non-transitory computer-readable medium includes a tangible storage medium of various types. Examples of the non-transitory computer-readable medium include a magnetic recording medium (for example, a flexible disk, a magnetic tape, and a hard disk drive), a magneto-optical recording medium (for example, a magneto-optical disk), a CD-read only memory (CD-ROM), a CD-R, a CD-R/W, and a semiconductor memory (for example, a mask ROM, a programmable ROM (PROM), an erasable PROM (EPROM), a flash ROM, and a random access memory (RAM)). Further, a program may be supplied to a computer by a transitory computer readable medium of various types. Examples of the transitory computer-readable medium include an electric signal, an optical signal, and an electromagnetic wave. The transitory computer-readable medium can supply a program to a computer via a wired communication path such as an electric wire and an optical fiber or a wireless communication path.

Although the disclosure has been described above with reference to the example embodiments, the disclosure is not limited to the above-described example embodiments. Various modifications that can be understood by those skilled in the art can be made to the configuration and the details of the disclosure within the scope of the disclosure.

A part or the whole of the above-described example embodiments may also be described as in supplementary notes below, which is not limited thereto.

Supplementary Note 1

An imaging system including:
a first control means for controlling, in such a way as to fix a focal position in a predetermined position, an iris imaging means for capturing an iris of a target person;
an authentication means for authenticating the target person, based on an iris image of the target person being captured by the controlled iris imaging means; and
a second control means for controlling the iris imaging means in such a way as to scan a focal position in a predetermined range, in order to re-authenticate the target person when authentication of the target person fails.

Supplementary Note 2

The imaging system according to Supplementary note 1, wherein
the first control means performs control in such a way as to fix the focal position when the target person is authenticated in a first authentication mode, and
the second control means performs control in such a way as to scan the focal position when the target person is authenticated in a second authentication mode.

Supplementary Note 3

The imaging system according to Supplementary note 2, wherein
the first authentication mode is an authentication mode of authenticating the target person while moving, and
the second authentication mode is an authentication mode of authenticating the target person while stopping.

Supplementary Note 4

The imaging system according to Supplementary note 3, further comprising guide control means for controlling guide means for guiding movement of the target person,
wherein the guide control means controls the guide means in such a way as to stop the target person while moving when authentication of the target person fails.

Supplementary Note 5

The imaging system according to Supplementary note 4, wherein
- the guide means is a gate through which the target person passes, and
- the guide control means performs control in such a way as to close the gate when authentication of the target person fails.

Supplementary Note 6

The imaging system according to Supplementary note 4, wherein
- the guide means is output means for outputting an authentication result of the target person, and
- the guide control means outputs information for stopping movement of the target person from the output means when authentication of the target person fails.

Supplementary Note 7

The imaging system according to any one of Supplementary notes 1 to 6, wherein
- the iris imaging means includes a variable focus lens, and
- the first control means and the second control means control a lens focus driving value of the variable focus lens.

Supplementary Note 8

The imaging system according to any one of Supplementary notes 1 to 7, wherein the second control means sets a focal position of the iris imaging means according to a position of the target person.

Supplementary Note 9

The imaging system according to any one of Supplementary notes 1 to 8, wherein the second control means changes an angle of view of the iris imaging means when authentication of the target person fails.

Supplementary Note 10

The imaging system according to any one of Supplementary notes 1 to 8, wherein the second control means changes an imaging direction of the iris imaging means when authentication of the target person fails.

Supplementary Note 11

The imaging system according to any one of Supplementary notes 1 to 10, wherein the first control means sets a region of interest (ROI) including an eye of the target person for the iris imaging means, based on a whole image being captured by whole imaging means for capturing the target person in an area wider than that of the iris imaging means.

Supplementary Note 12

The imaging system according to Supplementary note 11, wherein the first control means transforms coordinates of an eye of the target person in the whole image into coordinates in the iris image by using a coordinate transformation matrix associated with the fixed focal position, and sets the ROI, based on the transformed coordinates.

Supplementary Note 13

The imaging system according to Supplementary note 12, wherein the second control means sets the ROI for the iris imaging means, based on the transformed coordinates.

Supplementary Note 14

The imaging system according to Supplementary note 12 or 13, further comprising a plurality of iris imaging means as the iris imaging means,
- wherein the first control means selects the set iris imaging means from among the plurality of iris imaging means, based on the transformed coordinates.

Supplementary Note 15

The imaging system according to Supplementary note 14, wherein the second control means selects the set iris imaging means from among the plurality of iris imaging means, based on the transformed coordinates.

Supplementary Note 16

The imaging system according to any one of Supplementary notes 1 to 10, wherein the second control means sets an ROI including an eye of the target person for the iris imaging means, based on a whole image being captured by whole imaging means for capturing the target person in an area wider than that of the iris imaging means.

Supplementary Note 17

The imaging system according to Supplementary note 16, wherein the second control means transforms coordinates of an eye of the target person in the whole image into coordinates in the iris image by using a coordinate transformation matrix associated with a position of the target person, and sets the ROI, based on the transformed coordinates.

Supplementary Note 18

The imaging system according to Supplementary note 17, further comprising a plurality of iris imaging means as the iris imaging means,
- wherein the second control means selects the set iris imaging means from among the plurality of iris imaging means, based on the transformed coordinates.

Supplementary Note 19

The imaging system according to any one of Supplementary notes 1 to 18, further comprising illumination control means for performing control in such a way as to change an amount of light of illumination means for applying light to the target person when authentication of the target person fails.

Supplementary Note 20

An imaging method including:
- controlling, in such a way as to fix a focal position in a predetermined position, an iris imaging means for capturing an iris of a target person;

authenticating the target person, based on an iris image of the target person being captured by the controlled iris imaging means; and controlling the iris imaging means in such a way as to scan a focal position in a predetermined range, in order to re-authenticate the target person when authentication of the target person fails.

Supplementary Note 21

The imaging method according to Supplementary note 20, further comprising:

performing control in such a way as to fix the focal position when the target person is authenticated in a first authentication mode; and performing control in such a way as to scan the focal position when the target person is authenticated in a second authentication mode.

Supplementary Note 22

An imaging program for causing a computer to execute processing of:

controlling, in such a way as to fix a focal position in a predetermined position, an iris imaging means for capturing an iris of a target person;

authenticating the target person, based on an iris image of the target person being captured by the controlled iris imaging means; and controlling the iris imaging means in such a way as to scan a focal position in a predetermined range, in order to re-authenticate the target person when authentication of the target person fails.

Supplementary Note 23

The imaging program according to Supplementary note 22, further causing:

performing control in such a way as to fix the focal position when the target person is authenticated in a first authentication mode; and performing control in such a way as to scan the focal position when the target person is authenticated in a second authentication mode.

REFERENCE SIGNS LIST

10 IMAGING SYSTEM
11 FIRST CONTROL UNIT
12 AUTHENTICATION UNIT
13 SECOND CONTROL UNIT
20 COMPUTER
21 PROCESSOR
22 MEMORY
100 IMAGING SYSTEM
110 IRIS CAMERA
111 VARIABLE FOCUS LENS
120 WIDE FIELD OF VIEW CAMERA
130 ILLUMINATION DEVICE
140 HUMAN DETECTION SENSOR
150 GATE
160 DISPLAY DEVICE
200 CONTROL DEVICE
201 STORAGE UNIT
202 WIDE FIELD OF VIEW IMAGE ACQUISITION UNIT
203 EYE DETECTION UNIT
204 ILLUMINATION CONTROL UNIT
205 IRIS CAMERA SETTING UNIT
206 LENS FOCUS CONTROL UNIT
207 IRIS IMAGE ACQUISITION UNIT
208 FOCUSING IMAGE EXTRACTION UNIT
209 AUTHENTICATION UNIT
210 AUTHENTICATION RESULT OUTPUT UNIT
211 GATE CONTROL UNIT
300 DATABASE

What is claimed is:

1. An imaging system comprising:
a memory storing instructions, and
a processor configured to execute the instructions stored in the memory to:
control, in such a way as to fix a focal position in a predetermined position, an iris imaging unit capturing an image focusing on an iris of a target person;
authenticate the target person, based on an iris image of the target person being captured by the controlled iris imaging unit;
control the iris imaging unit in such a way as to scan a focal position in a predetermined range, in order to re-authenticate the target person when authentication of the target person fails;
control in such a way as to fix the focal position when the target person is authenticated in a first authentication mode; and
perform control in such a way as to scan the focal position when the target person is authenticated in a second authentication mode, wherein
the first authentication mode is an authentication mode of authenticating the target person while moving, and
the second authentication mode is an authentication mode of authenticating the target person while stopping.

2. The imaging system according to claim 1, wherein the processor is further configured to execute the instructions stored in the memory to control guide unit guiding movement of the target person, and
control controls the guide unit in such a way as to stop the target person while moving when authentication of the target person fails.

3. The imaging system according to claim 2, wherein
the guide unit is a gate through which the target person passes, and
the processor is further configured to execute the instructions stored in the memory to perform control in such a way as to close the gate when authentication of the target person fails.

4. The imaging system according to claim 2, wherein
the guide unit is an output unit outputting an authentication result of the target person, and
the processor is further configured to execute the instructions stored in the memory to output information for stopping movement of the target person from the output unit when authentication of the target person fails.

5. The imaging system according to claim 1, wherein
the iris imaging unit includes a variable focus lens, and
the processor is further configured to execute the instructions stored in the memory to control a lens focus driving value of the variable focus lens.

6. The imaging system according to claim 1, wherein the processor is further configured to execute the instructions stored in the memory to set a focal position of the iris imaging unit according to a position of the target person.

7. The imaging system according to claim 1, wherein the processor is further configured to execute the instructions stored in the memory to change an angle of view of the iris imaging unit when authentication of the target person fails.

8. The imaging system according to claim 1, wherein the processor is further configured to execute the instructions stored in the memory to change an imaging direction of the iris imaging unit when authentication of the target person fails.

9. The imaging system according to claim 1, wherein the processor is further configured to execute the instructions stored in the memory to set a region of interest (ROI) including an eye of the target person for the iris imaging unit, based on a whole image being captured by a whole imaging unit capturing the target person in an area wider than that of the iris imaging unit.

10. The imaging system according to claim 9, wherein the processor is further configured to execute the instructions stored in the memory to transform coordinates of an eye of the target person in the whole image into coordinates in the iris image by using a coordinate transformation matrix associated with the fixed focal position, and set the ROI, based on the transformed coordinates.

11. The imaging system according to claim 10, wherein the processor is further configured to execute the instructions stored in the memory to set the ROI for the iris imaging unit, based on the transformed coordinates.

12. The imaging system according to claim 10, further comprising a plurality of iris imaging units as the iris imaging unit,
wherein the processor is further configured to execute the instructions stored in the memory to select the set iris imaging unit from among the plurality of iris imaging unit, based on the transformed coordinates.

13. The imaging system according to claim 12, wherein the processor is further configured to execute the instructions stored in the memory to select the set iris imaging unit from among the plurality of iris imaging units, based on the transformed coordinates.

14. The imaging system according to claim 1, wherein the processor is further configured to execute the instructions stored in the memory to set an ROI including an eye of the target person for the iris imaging unit, based on a whole image being captured by a whole imaging unit capturing the target person in an area wider than that of the iris imaging unit.

15. The imaging system according to claim 14, wherein the processor is further configured to execute the instructions stored in the memory to transform coordinates of an eye of the target person in the whole image into coordinates in the iris image by using a coordinate transformation matrix associated with a position of the target person, and sets the ROI, based on the transformed coordinates.

16. The imaging system according to claim 1, wherein the processor is further configured to execute the instructions stored in the memory to perform control in such a way as to change an amount of light of illumination unit applying light to the target person when authentication of the target person fails.

17. An imaging method comprising:
controlling, in such a way as to fix a focal position in a predetermined position, an iris imaging unit capturing an image focusing on an iris of a target person;
authenticating the target person, based on an iris image of the target person being captured by the controlled iris imaging unit;
controlling the iris imaging unit in such a way as to scan a focal position in a predetermined range, in order to re-authenticate the target person when authentication of the target person fails;
controlling in such a way as to fix the focal position when the target person is authenticated in a first authentication mode; and
performing control in such a way as to scan the focal position when the target person is authenticated in a second authentication mode, wherein
the first authentication mode is an authentication mode of authenticating the target person while moving, and
the second authentication mode is an authentication mode of authenticating the target person while stopping.

18. A non-transitory computer-readable medium configured to store an imaging program for causing a computer to execute processing of:
controlling, in such a way as to fix a focal position in a predetermined position, an iris imaging unit capturing an image focusing on an iris of a target person;
authenticating the target person, based on an iris image of the target person being captured by the controlled iris imaging unit;
controlling the iris imaging unit in such a way as to scan a focal position in a predetermined range, in order to re-authenticate the target person when authentication of the target person fails;
controlling in such a way as to fix the focal position when the target person is authenticated in a first authentication mode; and
performing control in such a way as to scan the focal position when the target person is authenticated in a second authentication mode, wherein
the first authentication mode is an authentication mode of authenticating the target person while moving, and
the second authentication mode is an authentication mode of authenticating the target person while stopping.

* * * * *